United States Patent [19]

Bardo et al.

[11] 3,838,297

[45] Sept. 24, 1974

[54] PULSE SHAPING CIRCUIT

[75] Inventors: Eugene E. Bardo, Levittown; Franklin T. Schroeder, Exton, both of Pa.

[73] Assignee: Burroughs Corporation, Detroit, Mich.

[22] Filed: June 14, 1973

[21] Appl. No.: 369,983

[52] U.S. Cl. ................. 307/268, 307/260, 307/263, 307/265, 328/164

[51] Int. Cl. ........................................... H03k 5/00

[58] Field of Search ........... 307/260, 263, 265, 268; 328/60, 61, 164

[56] References Cited

UNITED STATES PATENTS

| | | | |
|---|---|---|---|
| 3,181,007 | 4/1965 | Hinds | 307/263 |
| 3,215,855 | 11/1965 | Cole et al. | 307/263 |
| 3,252,099 | 5/1966 | Dodd | 328/164 |
| 3,327,230 | 6/1967 | Konian | 307/268 |
| 3,368,153 | 2/1968 | Garde | 328/164 |
| 3,369,131 | 2/1968 | Stromer | 307/265 |
| 3,518,456 | 6/1970 | Mauduit et al. | 328/164 |
| 3,555,306 | 1/1971 | Cogar et al. | 307/268 |

*Primary Examiner*—Stanley D. Miller, Jr.
*Attorney, Agent, or Firm*—John J. Simkanich; Edward J. Feeney, Jr.; Edward G. Fiorito

[57] ABSTRACT

A latching one shot actuated flip-flop switch circuit is provided for transforming a distorted asynchronous pulse into a clean clock-synchronous pulse. Circuit time constants and logic interlocks predetermine the minimum duration of the output pulse.

9 Claims, 2 Drawing Figures

PULSE SHAPING CIRCUIT

BACKGROUND OF THE INVENTION

A paper tape reader is a common and often used input device for entering data into a computer system. Data is stored in tape in the form of holes or absenses thereof representing binary 1's and 0's respectively. This data is stored serially on the tape in varying numbers of channels depending upon tape width. Information is read, a line at a time, as the tape is advanced through the tape reader.

Often a light source and photo detector's are employed to read the tape. In employing this apparatus it is important to indicate to the read mechanism when to read each line in order that each line of holes is centered under the light source when photo sensing is monitored.

It is usual for tape sprocket holes to be aligned in a given relation to each data line on the tape. Therefore, a tape sprocket pulse, generated by a detent observing sprocket gear movement and thus signifying tape movement, can be used by the reader to control the reading of each data line.

Typically the tape reader operates by generating an advance command to the sprocket drive. In response, the sprocket will begin to move, generating the leading edge of the sprocket pulse. When the processor in the tape reader receives this leading edge it computes that the sprocket is moving and signals the sprocket drive to stop. The stopping of the sprocket generates the trailing edge of a sprocket pulse. The trailing edge of this sprocket pulse enables the tape reader to read the tape. Having read a data line from tape the processor reinitiates the process in order to read the next data line. Each read cycle can be about 25 ms long with about 15 ms being used for sprocket movement, 2 ms being used to assure complete voltage-level transition of a pulse, and 8 ms for photo-recognition, compilation and communication.

Because of the mechanical operation, tape advance pulses received from the detent sensor may be asynchronous, of possible varying length, and very often quite noise laden. Most often these pulses have very slow rise and fall times (1.5 ms) with noise spikes up to 2 ms wide riding on both slopes. Using these pulses directly to clock tape reader operation would result in misreading of information.

The leading and falling edges of these pulses, having such slow transition times, are in the "gray area" of voltage detection for long periods of time where noise spikes could erroneously trigger the tape reader.

It is therefore desirable to shape these pulses into noise-free pulses comprising rising and falling edges in synchronism with system clock (system clock being very much faster than a read cycle). It is also desirable to provide a leading edge to the tape reader when a voltage indicating a leading edge is detected from sprocket. It is further desirable to provide the trailing edge of the pulse when a trailing edge is detected. But in no instance should a trailing edge be generated until a fixed sprocket pulse duration time and one pulse rise time have elapsed.

An object of this invention, therefore, is to shape each sprocket pulse received into a pulse of minimum length with relatively fast rise/fall times ($\mu$s range or better), free of any noise.

Another object is to provide a minimum pulse duration of 17 ms, which is equal to sprocket travel time plus a pulse level transition time.

A further object is to synchronize the rising and falling edges of the shaped pulses with system clock.

SUMMARY OF THE INVENTION

The objectives of the invention are accomplished by a pulse-driven, latched, switching circuit in which a flip-flop generated, clock-synchronized pulse of at least a minimum duration is provided for each distorted pulse received. The leading edge of each output pulse is generated in response to the presence of a threshold input voltage; and after a predetermined delay, the falling edge of which is generated in response to the absence of an input threshold voltage.

A D-type flip-flop acts as a pulse detector and passes the input voltage level. A threshold voltage indicative of the leading edge of a pulse is passed to a "one-shot" pulse generator which drives an input of a J-K type flip-flop to create the leading edge of the shaped output pulse.

An output of the J-K flip-flop is fed back to lock the one shot's operation until the trailing edge of the shaped output pulse has been generated.

The fall of the "one-shot" pulse level which occurs after a duration of 15 ms enables the absence of a threshold voltage detect by the D flip-flop to be gated to a second "one-shot". This second "one-shot" is interconnected to a second J-K flip-flop in a similar manner to that of the first one-shot to the first J-K flip-flop. An output of this second J-K flip-flop drives the other input of the first J-K flip-flop to create the trailing edge of the shaped output pulse.

This second one-shot reverts to an inactive level after a pulse duration of 2 ms to reset all circuit components.

DESCRIPTION OF THE DRAWINGS

The novel features of this invention as well as the invention itself will best be understood from the following description taken in connection with the accompanying drawings in which like characters refer to like parts, and in which.

DETAILED DESCRIPTION

Figure 1:
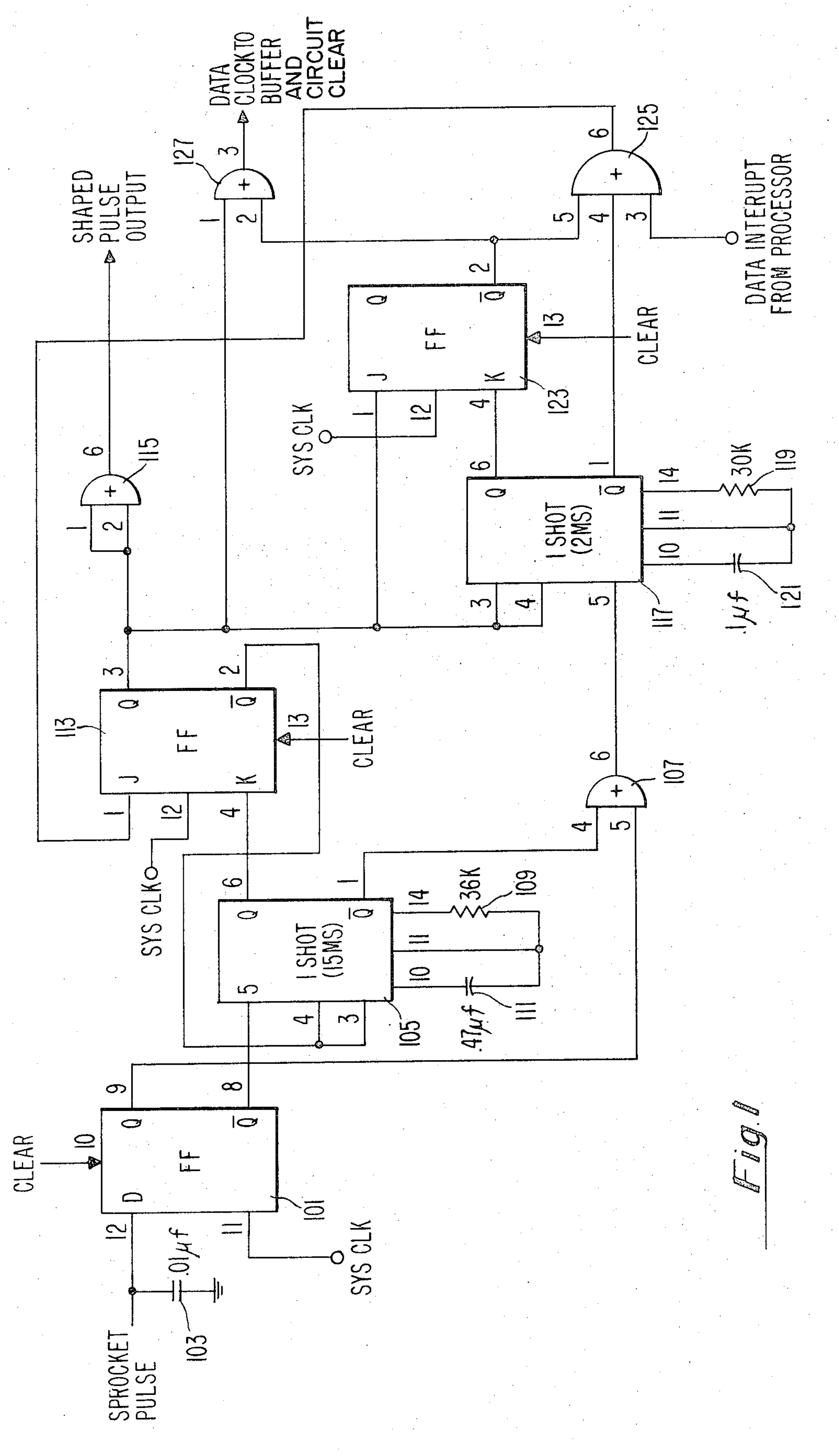
FIG. 1 is a schematic of the pulse shaper circuitry.

The preferred embodiment of the invention (FIG. 1) receives sprocket pulses from a sprocket advance mechanism. These pulses are input to the D-input, pin 12, of a D-type flip-flop 101.

An inactive level is received as a +5 volts with the signal going to a null (0 volts) to create a pulse.

A .01 $\mu$f capacitor 103 is connected between the input, pin 12, of flip-flop 101 and ground, thus performing initial filtering of noise on the incoming signals. Flip-flop 101 is clocked by system clock pulses to its pin 11 and cleared by a clear pulse to its pin 10. The $\bar{Q}$ output, pin 8, of flip-flop 101 drives the slow risetime input, pin 5, of a one-shot 105. While the Q output, pin 9, of this flip-flop 101 is connected to an input, pin 5, of a two-input, "and" gate 107.

One-shot 105 is tuned for a 15 ms pulse length by a R-C tank wherein a 36 K ohm resistor 109 and a .47 $\mu$f capacitor 111 are connected respectively between pins 11 and 14 and pins 10 and 11 of the one-shot 105. The Q output, pin 6, of one-shot 105 drives the K input, pin 4, of a J-K flip-flop 113, while the $\overline{Q}$ output, pin 1, of this one-shot 105 is connected to the other input, pin 4, of "and" gate 107.

Flip-flop 113 is clocked by system clock pulses to its pin 12 and cleared by a clear pulse to its pin 13. The $\overline{Q}$ output, pin 2, of flip-flop 113 is fed back to pins 3 and 4 of one-shot 105. The Q output, pin 3, from flip-flop 113 is connected to both inputs, pins 1 and 2, of a "two-input" "nand" gate 115.

The output, pin 6, of "and" gate 107 is connected to the slow rise time input, pin 5, of a second one-shot 117. One-shot 117 is tuned for a 2 ms pulse length by a R-C tank wherein a 30 K ohm resister 119 and a .1 $\mu$f capacitor 121 are connected respectively between pins 11 and 14 and pins 10 and 11 of one-shot 117. The Q output, pin 6, of one-shot 117 drives the K input, pin 4, of a second J-K flip-flop 123 while the $\overline{Q}$ output, pin 1, of this one-shot 117 is connected to an input, pin 4, of 3 input "and" gate 125.

As with the other J-K flip-flop, flip-flop 123 is clocked by system clock pulses to its pin 12 and cleared by a clear pulse to its pin 13. The $\overline{Q}$ output, pin 2, of flip-flop 123 is connected to a second input, pin 5, of "and gate" 125, and to an input, pin 2, of 2-input "and" gate 127. The J input, pin 1, of flip-flop 123 is connected to the second input, pin 1, of "and" gate 127, and also is connected to the Q output, pin 3 of flip-flop 113.

A data interrupt signal from the computer processor signifying that a data line has been read, is input to the third input, pin 3 of "and" gate 125.

The output from "and" gate 125, pin 6, is connected to the J input, pin 1, of the first J-K flip-flop 113, while the output from gate 127, pin 3, delivers a data clock pulse to the tape read buffer to load the data read and which in turn causes the circuit components to be reset.

The output from "nand" gate 115, pin 6, delivers the shaped sprocket pulse which is now free of noise to the tape read mechanism.

When in operation, the circuit receives negative sprocket pulses signifying sprocket advance. These pulses have relatively slow fall and rise times, 1–2 ms, between high (+5 volts) and low (0 volts) voltage levels with positive and negative noise (white noise) spikes riding both slopes. The invention detects when a pulse is received from sprocket by a monitoring for the presence of a threshold voltage. When this presence is detected the circuit assumes the leading edge of a pulse is received and provides a TTL initiated leading edge to the tape reader. After 15 ms, the pulse duration of a sprocket pulse, the circuit begins to look for the trailing edge of the pulse by monitoring for the absence of a threshold voltage. When this absence is detected the circuit assumes the trailing edge has been received and 2 ms later provides a TTL initiated falling edge to the tape reader. This 2 ms delay is included to compensate for the possibility that noise on the slopes may have triggered the detection. It allows for one level transition time to assure that the pulse has completely passed and that the sprocket has completely stopped.

Figure 2:
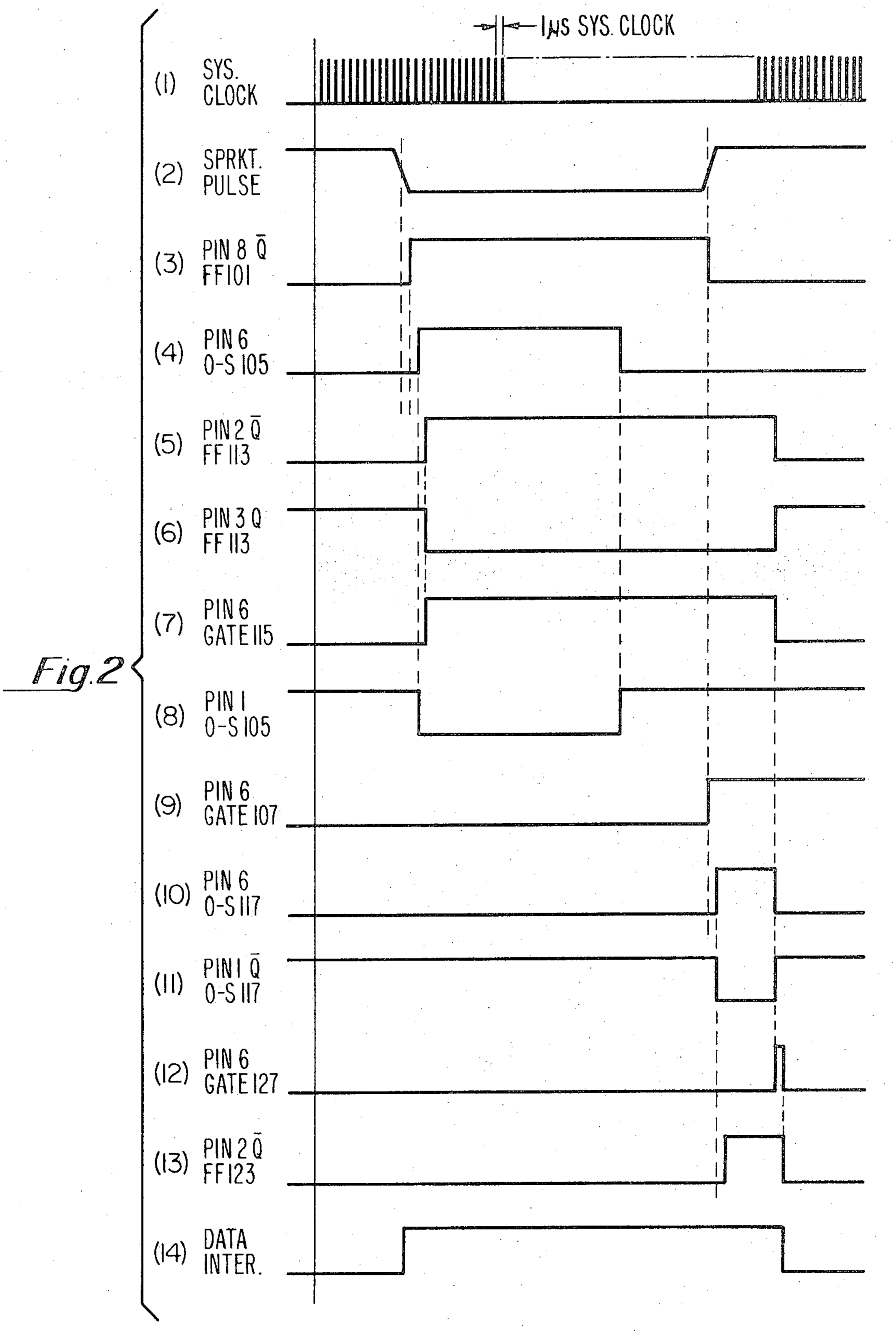
FIG. 2 is a timing diagram of the operation of the circuit.

Referring to FIG. 2 in conjunction with FIG. 1 the exact operation of the circuit can be understood when taken with the following discussion.

System clock, line 1, FIG. 2, is significantly faster at a 1 ms period than any logic operation.

The falling edge of the sprocket pulse, line 2, FIG. 2, is detected by flip-flop 101 and a "high" is clocked to the 15 ms one-shot 105 (line 3, FIG. 2). One-shot 105 then generates a 15 ms pulse, line 4, FIG. 2, to the K input of flip-flop 113 which has previously been reset. When flip-flop 113 is clocked it outputs a "high" to pins 3 and 4 of one-shot 105, line 5, FIG. 2, to lock the one-shot's inputs. At the same time a "low," line 6, FIG. 2, is sent to the output "nand" gate 115 which inverts it to a "high," line 7, FIG. 2, to be output to the tape reader as the leading edge of the sprocket pulse.

The operation of the circuit is therefore locked and uneffected by any external inputs until one-shot 105 "times-out" after 15 ms.

When one-shot 105 "times-out" a "low" will be input to the K input of flip-flop 113, line 4, FIG. 2, and a "high" or "enable" is input to "and" gate 107. This being accomplished, any "highs" input to flip-flop 101 will be considered as the trailing edge of the sprocket pulse and will be clocked to the enabled gate 107 a "high," converse of line 3, FIG. 2. "And" gate 107 will pass the high to one-shot 117 which then generates a 2 ms pulse to the K input of flip-flop 123, line 10, FIG. 2. Flip-flop 123 being previously reset. This "high" is then clocked through flip-flop 123 and to "and" gate 125, line 13, FIG. 2. At the same time a high is received from the tape reader, line 14, FIG. 2, to enable the "gate" 125 to pass any signal received from the $\overline{Q}$ output of one-shot 117. After 2 ms the Q output from one-shot 117 falls to a "low" and the Q output to gate 125 goes to a "high," line 11, FIG. 2. Gate 125 passes this "high" to the J input of flip-flop 113, line 12, FIG. 2. Flip-flop 113 is consequently clocked to pass a "high," line 6, FIG. 2, which is inverted by "nand" gate 115 to be output as the trailing edge of the sprocket pulse, line 7, FIG. 7.

The same "high" to gate 115 passes to lock the inputs of one-shot 117. In addition, it goes to "and" gate 127 which passes it to reset the circuit to its original state.

What is claimed is:

1. A pulse shaper circuit for transforming distorted pulses into clean pulses of minimum duration comprising:

means for detecting a voltage threshold level and an absence thereof;

means connected to an output of said detecting means for generating a first pulse when said threshold is detected;

means connected to an output of said detecting means and to an output of said first pulse generating means for gating through said detected threshold absence when said first pulse has decayed;

means connected to the output of said gating means for generating a second pulse when said threshold absence is gated through;

means connected to an output of said second pulse generating means for passing an enabling signal when said second pulse has decayed; and means connected to an output of said first pulse generating means and to an output of said passing means for initiating the leading edge of a clean pulse when the leading edge of said first pulse is generated and for initiating the trailing edge of said clean pulse when said enabling signal is passed.

2. The circuit of claim 1 also including:

feedback means connecting an output of said initiating means to an input of said first pulse generating means for inhibiting operation of said first pulse generating means, and feedback means connecting an output of said initiating means to an input of said second pulse generating means for inhibiting operation of said second pulse generating means.

3. The circuit of claim 2 wherein said passing means includes:

means connected to an output of said initiating means and connected to an output of said passing means for clearing the circuit.

4. A clock-synchronized logic shaping circuit for transforming a distorted asynchronous paper tape advance pulse input into a clean clock-synchronous pulse output, during the presence of a data enable signal from a tape reader processor, comprising:

a D-type flip-flop receiving said distorted pulse;

a first one-shot pulse generator having a slow-rise time input and fast rise time inputs, said slow rise time input being connected to an output of said D-type flop-flop;

a first J-K type flip-flop having an input connected to an output of said first one-shot;

a first "and" gate being connected on its inputs to an output of said D flip-flop and an output of said first one-shot;

a second one-shot pulse generator having a slow rise time input and fast rise time inputs, said slow rise time input being connected to the output of said first "and" gate;

a second J-K type flip-flop having an input connected to an output of said second one-shot; and a second "and" gate having a separate input connected to an output of said second J-K flip-flop, to an output of said second one-shot and to said data enable input, the output of said second "and" gate being connected to an input of said first J-K flip-flop.

5. The circuit of claim 4 wherein the operation of said D flip-flop and said first and second J-K flip-flops are each clock-synchronized.

6. The circuit of claim 5 wherein the time constant of said first and second one-shot pulse generators are 15 ms and 2 ms respectively.

7. The circuit of claim 4 wherein an output of said first J-K flip-flop is connected to said fast rise time inputs of said first one-shot and wherein the complimentary output of said first J-K flip-flop is connected to said fast rise time inputs of said second one-shot.

8. The circuit of claim 7 also including a connection from said second one-shot's fast rise time inputs to an input of said second J-K flip-flop.

9. The circuit of claim 8 also including a third "and" gate having an input connected to the output of said first J-K flip-flop which connects to said fast rise time inputs of said second one-shot and having an input connected to the output of said second J-K flip-flop which connects to an input of said second "and" gate, said third "and" gate having its output connected to the "set" input of said D type flip-flop and to the "reset" input of said first and second J-K flip-flops.

* * * * *